US008544235B2

(12) United States Patent
Leiseder (10) Patent No.: US 8,544,235 B2
(45) Date of Patent: Oct. 1, 2013

(54) BAR-TYPE SUPPORTING FRAMEWORK

(76) Inventor: Ulrich Leiseder, Reinbek (DE)

(*) Notice: Subject to any disclaimer, the term of this patent is extended or adjusted under 35 U.S.C. 154(b) by 550 days.

(21) Appl. No.: 12/742,163

(22) PCT Filed: Nov. 5, 2008

(86) PCT No.: PCT/EP2008/009321
§ 371 (c)(1),
(2), (4) Date: May 10, 2010

(87) PCT Pub. No.: WO2009/062618
PCT Pub. Date: May 22, 2009

(65) Prior Publication Data
US 2010/0252518 A1    Oct. 7, 2010

(30) Foreign Application Priority Data
Nov. 12, 2007  (DE) .......................... 10 2007 054 205

(51) Int. Cl.
*E04H 12/00*   (2006.01)
*E04B 1/19*    (2006.01)

(52) U.S. Cl.
CPC .................................. *E04B 1/1906* (2013.01)
USPC ....................................................... 52/655.1

(58) Field of Classification Search
USPC ............ 52/655.1, 655.2, 127.1, 127.6, 127.7, 52/633, 653.1, 653.2, 690, 654.1, 648.1
See application file for complete search history.

(56) References Cited

U.S. PATENT DOCUMENTS

| 3,864,049 | A  |   | 2/1975 | Ono |         |
|-----------|----|---|--------|-----|---------|
| 4,183,190 | A  |   | 1/1980 | Bance |       |
| 4,646,504 | A  | * | 3/1987 | Britvec | 52/655.2 |
| 5,421,666 | A  | * | 6/1995 | Spears | 403/176 |
| 5,626,434 | A  | * | 5/1997 | Cook | 52/655.1 |
| 6,672,789 | B2 | * | 1/2004 | Chen | 403/171 |
| 6,675,546 | B2 | * | 1/2004 | Coles | 52/655.1 |

FOREIGN PATENT DOCUMENTS

| DE |      55423    | 4/1967  |
|----|---------------|---------|
| DE |  2427426 A1   | 12/1975 |
| DE |  2556813 B2   | 7/1977  |
| DE |  3035698 A1   | 4/1982  |
| DE |  3610686 A1   | 10/1987 |
| DE |  4402708 A1   | 8/1995  |
| DE | 20016876 U1   | 10/2001 |
| DE | 20215594 U1   | 1/2003  |
| DE | 10218597 A1   | 3/2003  |
| WO |  01/91859 A   | 12/2001 |

* cited by examiner

*Primary Examiner* — William Gilbert
*Assistant Examiner* — Kyle Walraed-Sullivan
(74) *Attorney, Agent, or Firm* — Richard M. Goldberg (57) ABSTRACT

A bar-type supporting framework having nodes (10, 12, 14) and bars (16, 18, 20) held between the nodes in a form-fitting manner at least in the direction transverse to the longitudinal direction of the bar by engagement elements (34), such that at least one bar (20) and/or at least two nodes (14) connected by a bar are formed of a plurality of parts (24, 26; 30, 32) that are form-fittingly held together by relative rotation of the engagement elements (34) of the bars and the nodes about an axis extending in the longitudinal direction of the bars.

10 Claims, 7 Drawing Sheets

BAR-TYPE SUPPORTING FRAMEWORK

The invention relates to a bar-type supporting framework having nodes and bars that are held between the nodes in form-fitting manner at least in the direction transverse to their longitudinal direction by means of engagement elements.

Bar-type supporting frameworks which have rigid junctions between bars and nodes are heretofore mounted either by plugging the bar ends into the nodes or by means of flanges, mounting panels or the like which permit to insert the entire bars laterally between fixed nodes. In order to improve the intrinsically low rigidity or bending and torsion strength of the bar/node junctions, the junctions between highly loaded frameworks are frequently configured as articulated junctions, i.e. the framework is configured as a carcass, wherein the rigidity of the meshes and hence the rigidity of the framework as a whole is achieved only by diagonal elements.

In the context of this application, the term "bars" is not limited to bars in the proper sense of the word but includes for example also tubes as well as two-dimensionally extended elements such as glass panes or closed covers. The decisive criterion is that the forces are transmitted to the neighboring bars essentially locally via the nodes.

The strength and rigidity of the junction depends on the one hand on the type of junction, e.g. gluing, welding or press-fit, and on the other hand on the material properties of the bars and nodes. An important factor is the geometric overlap between the engagement elements of the bars and the nodes.

DE 102 18 597 A1 describes a bar-type supporting framework with bars made of wood or bamboo that are held between the nodes through plug-in connections. The plug-in connections are formed by round lugs at the end faces of the bars and complementary, rotationally symmetric seats in the nodes. Once the elements have been fitted together, the junction can be fixed by gluing, clamping or the like.

Such plug-in type frameworks have the drawback that, for forming the plug-in connections, it is necessary that the nodes that are located at opposite ends of a bar are moved relative to the bar in longitudinal direction of this bar, in order for the engagement elements to be able to be inserted one into the other.

When a part of the framework has been established already, this is possible only when other bars which have already been joined to the nodes in consideration are preliminarily subjected to a bending strain in order to enable the necessary movement of the nodes. The larger the (tensional) strength of the bar/node junctions is required to be, the larger should be the overlap between the engagement elements, and the larger is the bending deformation of the other bars, which, in turn, limits the bending strength of these bars.

DE 200 16 876 U1 describes a bar-type supporting framework wherein the nodes are respectively composed of two parts, and concave seats for the ends of the bars are formed to one half each in both of the two parts of the node. Here, a larger overlap between the engagement elements of the bars and the nodes can be achieved without the need for bending the bars when the framework is mounted. In this case, however, the two parts of each node must be held together by additional fixing means, e.g. by screws, so that the strength of the framework as a whole depends critically upon the strength of these additional fixing elements. When a high rigidity is required, this results in constraints in terms of the material and the geometric shape of the nodes.

It is an object of the invention to provide a bar-type supporting framework of the type described above, which has a high strength and can nevertheless be mounted easily.

According to the invention, this object is achieved by the feature that at least one bar and/or at least two nodes connected by this bar are composed of a plurality of parts which are form-fittingly held together by relative rotation of the engagement elements of the bars and the nodes about an axis that extends in longitudinal direction of the bars.

In case that the bar is composed of several parts, the different parts can be inserted one after the other in the gap between two nodes, without any need to increase the distance between these nodes. When the bar composed of several parts is subsequently rotated about its longitudinal axis, the engagement elements which establish the junction with the node act like a bayonet catch that connects not only the bar with the node but also assures that the several parts of the bar are form-fittingly held together by the nodes.

In the case that each of the two nodes is composed of a plurality of parts, the bar can first be placed in corresponding seats of the two node parts, and then the nodes are completed by adding the respective other part. Then, however, the fixation of the parts of the node relative to one another is not achieved by additional fixing means, but again by rotation of the bar about its longitudinal axis. This rotation brings the engagement elements of the bar into engagement with the complementary engagement elements of both parts of the node, so that they hold the parts of the node together.

When both, the bars and the nodes are composed of several parts, the two effects that have been described above are achieved in combination.

In any case, the advantage is that a form-fitting fixation of all relevant parts, i.e. the parts of the bars and the nodes, can be achieved without additional fixing means, so that a simple mounting procedure is achieved wherein the nodes need not be moved in longitudinal direction of the bar connecting them, as would be the case for a plug-in connection. Consequently, in the framework according to the invention, the bars and the nodes and the joints there between can, in principle, be configured to be as rigid as desired, and there are no constraints as to the amount of overlap between the engagement elements of the nodes and the bars. As a result, a very stable framework can be obtained with simple means and with relatively compact nodes.

Useful details and further developments of the invention are indicated in the dependent claims.

The invention is particularly advantageous for frameworks the bars of which have longitudinally extending fibers which give them a high tensile strength, e.g. frameworks with bars made of wood, bamboo, fiber-reinforced plastics and the like, likewise for frameworks the nodes of which are made of fibrous material, e.g., laminated wood. In contrast to conventional fixing means such as screws, locking pins and he like, the engagement elements according to the invention do not result in a weakening of the material or to a splitting of the material in the direction of the fibers. Moreover, in case of junctions fixed with adhesive, the tensile strains result only in shear strains on the fibrous material at the glue points. Then, an increased overlap and, hence, an increased adhesion surface that is made possible by the invention contributes to a substantial improvement in tensile strength.

The bars may also be composite members made of different materials, e.g., bars of bamboo with end caps made of metal or the like forming the engagement elements.

Of course, the parts of the nodes and/or bars may additionally be fixed one upon the other, e.g. by gluing, clamping, bandaging or additional cross-links between different bars. In case of an adhesive junction, not only the parts of the bars and the parts of the nodes may be glued together, but also the contact surfaces between the engagement elements of the bars and the nodes after they have been rotated into their final position. For example, before the parts are mounted, these surfaces may be coated with a glue which cures only after the bars have been rotated into their final locking position. As an alternative, the adhesive at the contact surfaces of the engagement elements may be applied in the form of capsules that burst and discharge the glue or adhesive as soon as the engagement elements come into engagement with one another. It is also possible that the complementary engagement elements have a slightly non-circular shape, so that relative rotation is accompanied by a radial press-fit effect. In this way, it is possible to obtain a stable press-fit and/or a compression-assisted—and therefore stronger—adhesive junction.

In case that the nodes are composed of several parts and are made of natural wood, it is preferable in terms of strength when the fibers in the different parts of the nodes are oriented orthogonal to one another at the junction surfaces at which they are glued together, similarly as in plywood.

The engagement elements may also be configured such that they establish a form-fit junction between the bars and the nodes not only in transverse direction of the bar but also in longitudinal direction thereof. In this case, the relative rotation of nodes and bars may also be utilized for firmly tightening the bar between the nodes that are located at its opposite ends. As an alternative, such a tightening may also be achieved by means of an embedded sub-network, e.g. a network formed of strings or wires with tensile strength which pass through through-going cavities in the bars and are connected to one another inside of the nodes of the framework. When both, the bars and the nodes of the framework are composed of several parts or are at least slotted, a largely pre-fabricated sub-network can be embedded in the mounting process.

Since the engagement elements of the framework according to the invention must anyway have a certain rotational symmetry permitting the relative rotation thereof, it is preferable if these engagement elements have an annular or part-annular shape. Then, it is possible to configure the bars as hollow bars, with the cavities at the ends of the bars being connected to one another via cavities in the nodes. In this way, one obtains, inside of the supporting framework, a line network that may be used for electrical leads, signal leads, gas or liquid pipes or the like. By gluing or press-fitting, the engagement elements of the supporting framework, the network of the cavities formed inside the bars and the nodes may be hermetically sealed from the environment, so that the cavities may directly be utilized as pipings for fluid media.

Embodiments of the invention will now be explained in conjunction with the drawings, wherein.

Figure 1:
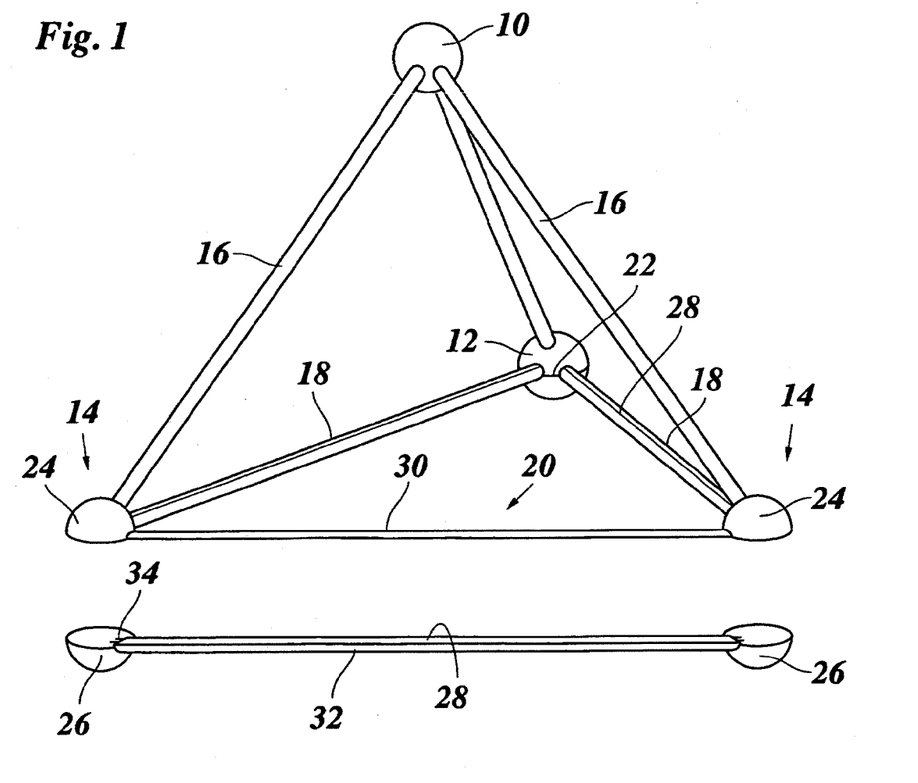
FIG. 1 is a perspective view of a partly mounted bar-type supporting framework according to the invention.

FIG. 1 shows a simple example of a supporting framework which, here, has the form of a tetrahedron with spherical nodes 10, 12, 14 connected by bars 16, 18, 20. When this framework is mounted, the bars 16 may be inserted into corresponding plug-in seats of the nodes 10, 12 and 14, as is commonly known. When, however, the lower bars 18 and 20 are to be inserted, such a plug-in connection is no longer possible without temporarily bending the bars 16 apart in order to provide sufficient space between the nodes 12 and 14.

For this reason, in the framework that is proposed here, the nodes 12 and 14 and also the bars 18, 20 connecting them are each composed of two parts. The nodes 12, 14 are divided into two parts (hemispheres) 24, 26 at horizontal separating planes 22. Correspondingly, the bars 18 and 20 are divided into half-bars 30, 32 at longitudinally extending separating planes 28. In case of the bars 18, the separating planes 28 are oriented vertically. The nodes 14, however, have been shown in FIG. 1 in a not completely mounted state in which the two hemispheres 24, 26 are not yet fitted together to form the complete node 14, and the half-bars 30, 32 are not yet fitted together to form the complete bar 20, neither.

Each of the half-bars 30, 32 has its end connected to the corresponding hemispheres 24, 26 by means of engagement elements 34 the construction of which will be described in greater detail below. These engagement elements have such a configuration that the half-bar 30 can be placed between the hemispheres 24 without any need to increase the distance between these hemispheres. When, now, the hemispheres 26 and the half-bar 32 have been placed so as to complete the nodes 14 and the bar 20, the bar 20 is subsequently rotated by an angle of 90° about its longitudinal axis, so that the separating plane 28 reaches the vertical orientation as has been shown for the bars 18. In this process, the engagement elements 34 at the ends of the two-half bars 30 and 32 come into engagement with corresponding engagement elements (not shown in FIG. 1) of both hemispheres 24, 26, so that the two hemispheres 24, 26 of each node and also the two half-bars 30, 32 of each bar are form-fittingly interlocked with one another, so that they can no longer fall apart. In this way, one obtains very stable, rigid framework which, in principle, does not need any adhesive nor any other fastening means such as screws, clamps or the like for fixing.

Optionally, it is of course possible to additionally fix the framework, e.g. by gluing the half-bars 30, 32 and also the hemispheres 24, 26 together. Likewise, the contact surfaces of the engagement elements 34 may be fixed with an adhesive at the corresponding engagement elements of the hemispheres, which, in particular, prevents the bars from being rotated back into the non-locking position. Alternatively, the bar may be locked against rotation in any other way, e.g. by means of integrated stops and barbs at the engagement elements 34 and the corresponding seats in the nodes, which stops and barbs limit the angle of rotation of the bar and prevent a rotation in opposite direction. Likewise, the bar may be locked against rotation by means of locking pins inserted through the engagement elements in the nodes. However these locking pins serve only for preventing the rotation and are not necessary for providing the basic stability of the framework, other than in conventional frameworks with composite nodes.

Figure 2:
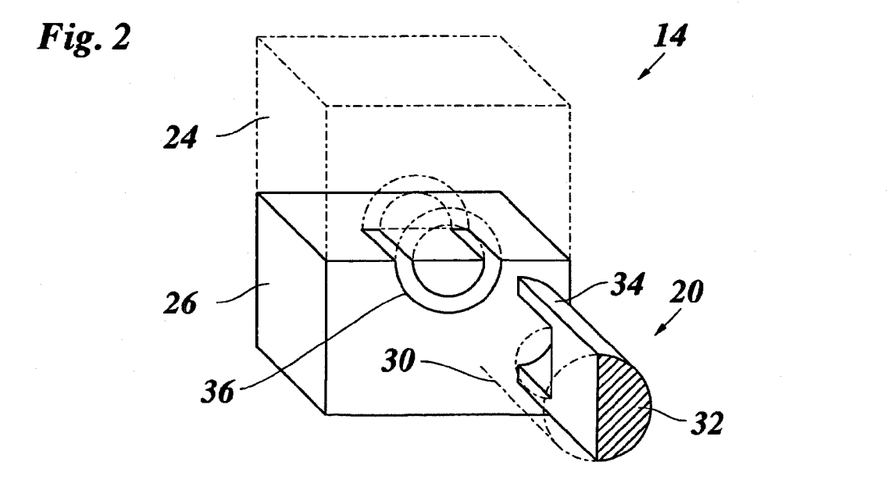
FIG. 2 is a perspective detail view of engagement elements in a framework according to the invention.

For illustrating a possible configuration of the engagement elements, FIG. 2 shows a perspective view of a node 14, which has in this case a square shape and is composed of two parts 24, 26 corresponding to the hemispheres in FIG. 1. The part 24 has only been shown in phantom lines.

Of the bar 20, only a cut end of the half-bar 32 has been shown in continuous lines, whereas the complementary half-bar 30 has only been shown in phantom lines. In this example, the engagement element 34 of each half-bar is shaped as a half-cylindrical hollow extension of the corresponding half-bar, the extension being open at the free end. Thus, the half-cylindrical extensions of both half-bars 30 and 32, together, will form a complete hollow cylinder. In the parts 24, 26 of the node 14, engagement elements 36 which are complementary to the engagement elements 34 have the shape of half-cylindrical grooves which, after fitting the parts together, form an annular groove.

In FIG. 2, the engagement elements 34 and 36 have respectively been shown in the angular position which corresponds to their engaged position, but they have been shown with an axial offset, so that the shapes thereof can be seen more clearly.

Figure 3:
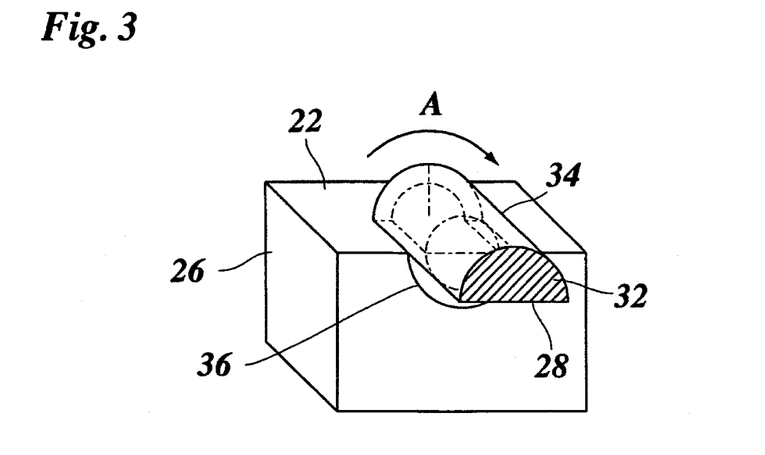
FIGS. 3 and 4 show the engagement elements of FIG. 2 in different positions during the mounting process.
Figure 4:
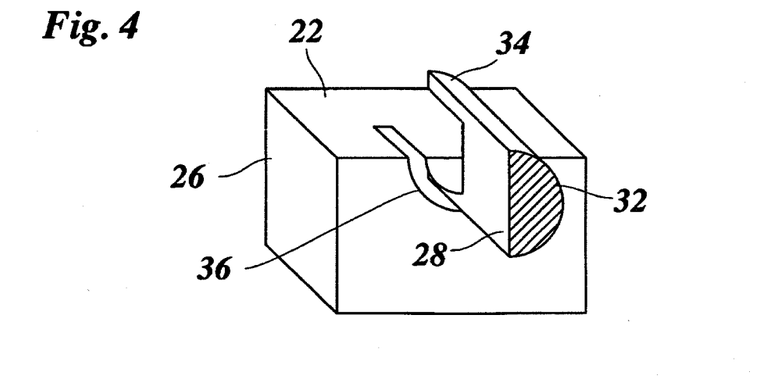

FIGS. 3 and 4 illustrate how the junction between the half-bar 32 and the part 26 of a node is formed. The half-bar is at first held in such an orientation that a surface which corresponds to the separating plane 28 faces towards the surface of the part 26 which corresponds to the separating plane 22, and the engagement elements 34 and 36 are flush with each other (FIG. 3). Subsequently, the half-bar 32 is rotated in direction of arrow A about the central axis of the complete bar 20 to be formed, so that the engagement element 34 enters into the groove-shaped engagement element 36. The half-bar is first rotated about an angle of 180° so that the engagement element 34 is completely accommodated in the engagement element 36 and the separating planes 22 and 28 coinside. This condition has not been shown in FIGS. 3 and 4 but corresponds to the condition of the half-bar 32 in FIG. 1.

The same procedure is applied to the other half-bar 30 and the corresponding parts 24 of the nodes. Then, the parts of the nodes 14 and of the bar 20 are fitted together and optionally glued together, and finally, the completed bar 20 is rotated back by an angle of 90°, so that the half-bar 32 reaches the position shown in FIG. 4. In this condition, the engagement elements 34, 36 are still in engagement with one another, but no longer on an arc of 180° but only on an arc of 90°. On the other hand, the engagement element 34 of the half-bar 32 is now also in engagement with the groove-shaped engagement element of the part 24 of the node that has not been shown in FIG. 4. The half-cylindrical engagement elements 34 supplement each other to form a complete hollow cylinder which surrounds a cylindrical peg that is limited by the groove-shaped engagement element 36 and is formed to one half by the part 24 and to the other half by the part 26. In this way, the two parts 24, 26 of the node are now held together by form-fit in the direction transverse to the longitudinal direction of the bar 20, and it is not important whether or not these parts of glued together. Conversely, the two half-bars 30 and 32 are form-fittingly held together by the engagement elements 36 of the node.

Optionally, the internal and external surfaces of the engagement elements 34 (and/or 36) may be coated with an adhesive before the mounting steps that have been described above are performed, whereby the bar 20 is fixed in its angular position after the adhesive has cured. The form-fitting interlock of the parts with one another is then conserved permanently, and the strength, in particular the tensile strength, of the node/bar junction depends upon the strength (thickness and length) of the engagement elements 34 but not on the adhesive force with which the different parts are glued together. Since the bar/node junctions are not formed by plug-in connections, the amount of overlap between the engagement elements 34 and 36, in this case the length of the half-cylindrical structures, may be selected so large that the required strength is achieved, without compromising the mounting process for the framework. An increased amount of overlap will at the same time increase the surface area of the adhesive junction and hence, in, in particular, the tensile strength.

Figure 5:
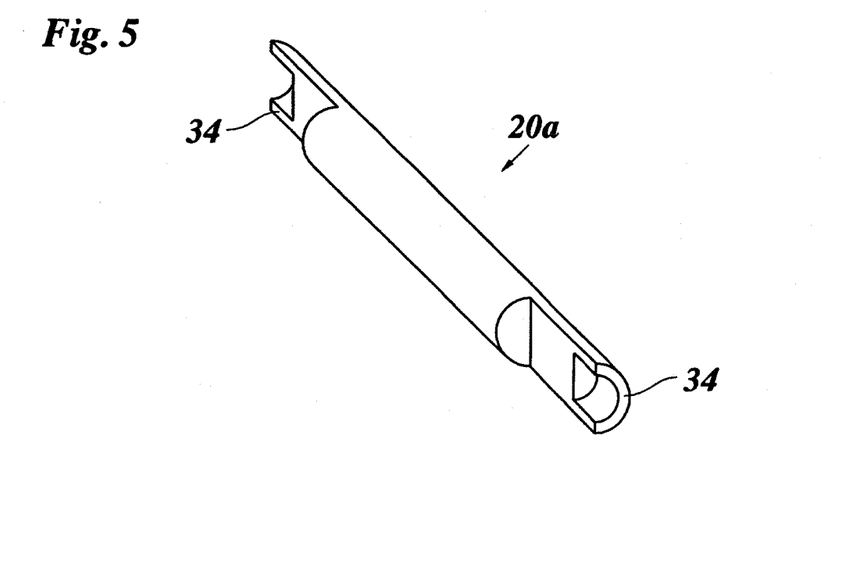
FIG. 5 is a perspective view of a bar of a framework according to the invention.

The bars of the framework need not necessarily be divided into two half-bars at their median plane. FIG. 5 shows an example of a bar 20a the central portion of which is configured as a round full bar. This bar 20a may optionally be completed by parts that are complementary to the two end portions, resulting in a complete bar that may be mounted between nodes 14 in the same manner as has been described above for the bar 20.

Figure 6:
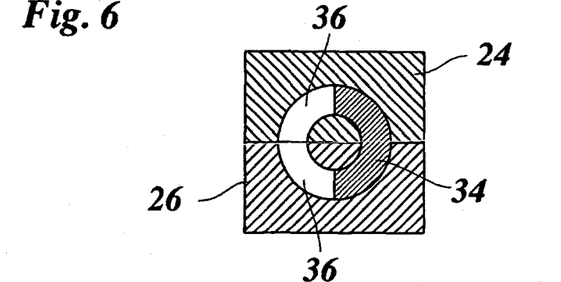
FIG. 6 is a cross-sectional view of an engagement portion of a framework having a bar as shown in FIG. 5.

When the strength requirements are not particularly high, it is also possible to use a bar with the configuration shown in FIG. 5 alone, without using the additional complementary parts. In this case, the full cylindrical central portion should reach up directly to the half-cylindrical engagement elements 34 so as to fit exactly into the space between the nodes. FIG. 6 shows a cross-sectional view of the engagement element 34 of such a bar and of the parts 24, 26 of the node in the engaged position. It can be seen that, even in this case, the single engagement element 34 of the bar engages the engagement elements 36 of both parts of the node and holds them together in form-fit.

Likewise, most of the variants that will be described below may be realized optionally with integral bars or with bars composed of several parts.

Figure 7:
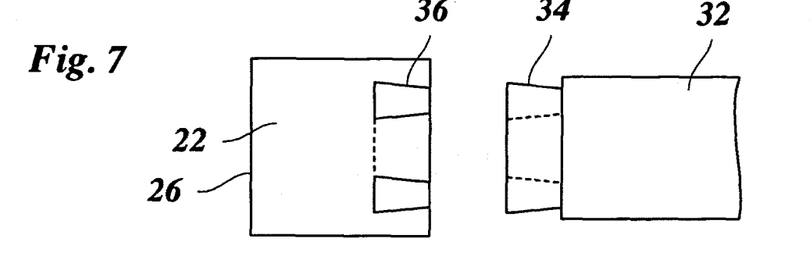
FIGS. 7 to 10 show examples for different configurations of engagement elements in the framework.

FIG. 7 shows an embodiment similar to the one in FIGS. 2 to 4, wherein, however, the engagement elements 34, 36 have complementary dove tail profiles. The drawing shows a view onto the surface of the part 26 which coincides with the separating plane 22, and onto the back side of the half-bar 32 facing away from the separating plane. The dove tail-shaped engagement elements 34 and 36 establish a form-fit between the bar and the adjacent node also in longitudinal direction of the bar 20 or the half-bar 32.

Figure 8:
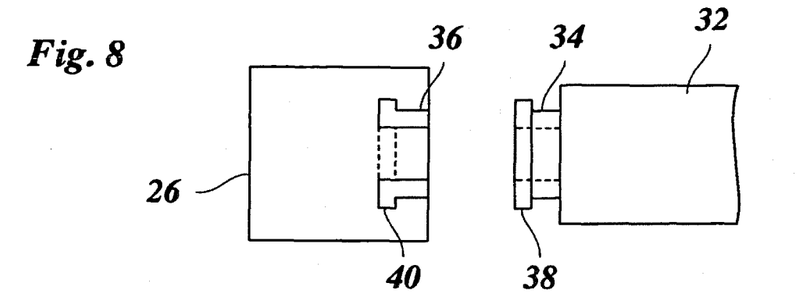

FIG. 8 shows, in a view analogous to FIG. 7, a variant in which the form-fit is not achieved by dove tail profiles but rather by a collar 38 at the engagement element 34 and an annular groove 40 in the engagement element 36.

Figure 9:
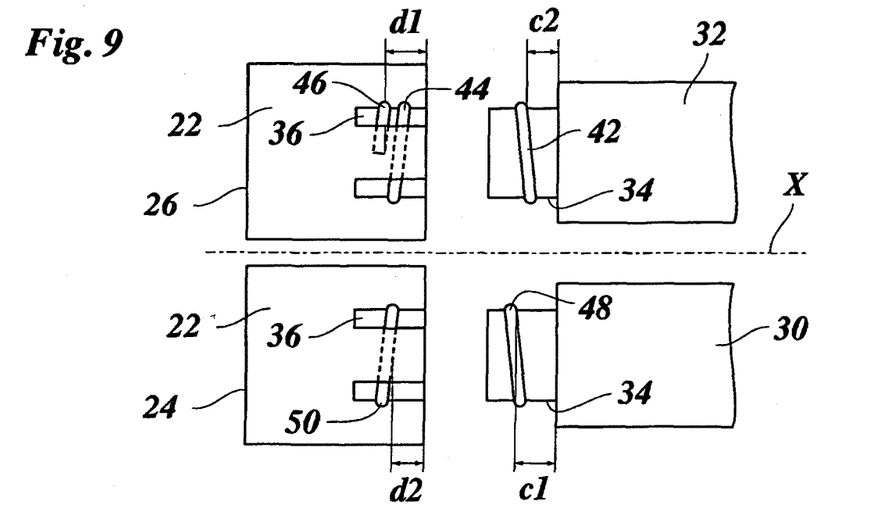

In an embodiment shown in FIG. 9, the engagement elements 34 and 36 have screw thread-type structures which provide not only a form-fit in longitudinal direction of the bar but also offer a possibility to tighten the bar to the node in this direction. What has been shown here are both parts 24, 26 of the node, with a view on the separating plane 22, as well as both half-bars 30, 32, respectively with a view onto the side facing away from the separating plane 28. On its outer peripheral surface, which extends over an arc of 180°, the engagement element 34 of the half-bar 32 has a thread-like bulge 42, and the engagement element 36 of the part 26 of the node has two thread-like grooves 44, 46 which both form part of an internal thread that is complementary to the bulge 42. In case of the half-bar 30, the engagement element 34 has a corresponding bulge 48 in a position axially offset relative to the bulge 42, and the part 24 of the node has, in its engagement element 36, a groove 50 complementary thereto.

For connecting the half-bar 32 to the part 26, the engagement element 34 is brought into a position in which the end of the bulge 42 that forms the top end in the drawing is flush with the top end of the groove 44. Subsequently, the half-bar 32 is rotated clock-wise by an angle of 180°, so that the engagement element 34 is screwed into the engagement element 36. The half-bar 30 and the part 24 are manipulated correspondingly. Then, the two parts of the node and the half-bars are fitted together. In the drawing, this would mean that the part 24 is flipped over onto the part 26 about the axis X in FIG. 9. Then, the top end of the groove 50 in FIG. 9 comes into a position in which it is flush with the bottom end of the groove 44. When, now, the bar formed by the two half-bars 30 and 32 is rotated further in screw-in direction, the bulge 42 enters into the groove 50 of the part 24, and, simultaneously, the bulge 48 partly exits from the groove 50 (and thereby clears the way for the bulge 42) and enters to the groove 46 of the part 26. As a result of this screw-in movement, the two half-bars 30, 32 are firmly tightened against the parts 24 and 26 of the node. This requires a correct choice for the axial position of the bulges 42 and 48 and the grooves 44, 46 and 50. In particular, the distance d1 shown in FIG. 9 must be equal to the distance c1, and the distance d2 must be equal to the distance c2. The distances c1 and c2 indicate the axial position of the leading end of the bulge 48 and 42, respectively, relative to the root point of the engagement element 34, and the distances d1 and d2 indicate the axial position of this leading end of the bulge 48 and 42, respectively, in the completely screwed-in condition inside the grooves 46, 50.

Figure 10:
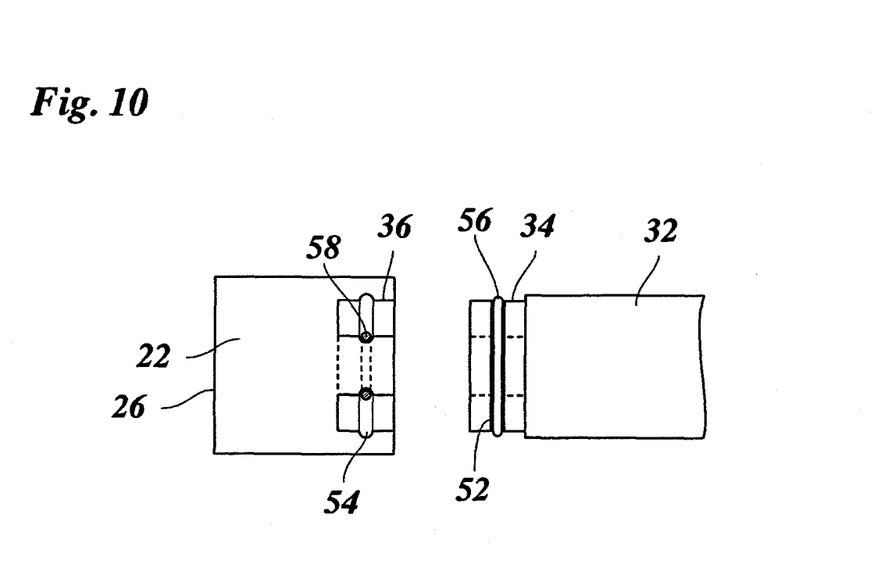

FIG. 10 shows an embodiment in which the engagement elements 34 and 36 have a circumferential groove 52, 54 in their inner and outer half-cylindrical peripheral surface, respectively, in corresponding axial positions. When these engagement elements are rotated into engagement, half-annular wires or strips 56, 58 may additionally be inserted for providing form-fit in axial direction.

Figure 11:
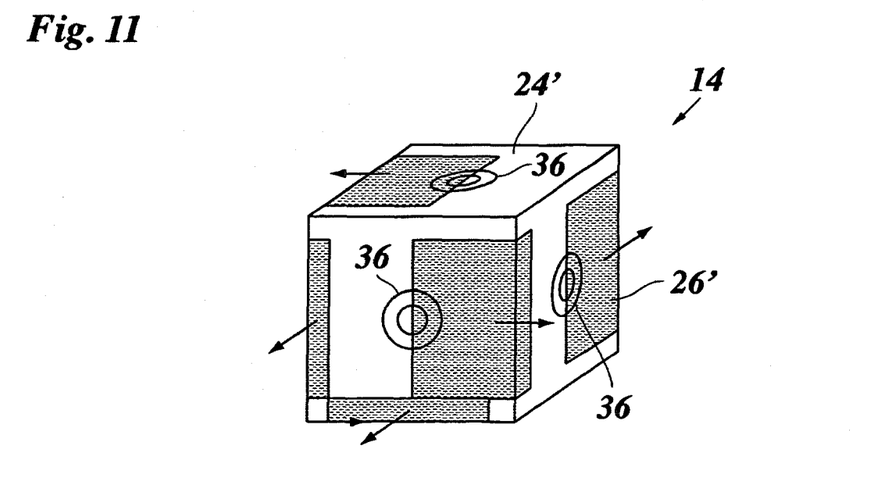
FIG. 11 is a perspective view of a node of a framework according to another embodiment.

FIG. 11 shows another embodiment of the node 14. This node is cubic and has an engagement element 36 for a bar in each of its six surfaces, so that the node may be utilized in a central position in a three-dimensional framework in which bars extend from the node in all six directions in space. In order to be able to mount all these bars in the manner that has been described above, the node shown in FIG. 11 is composed of several parts, comprising a base part 24' and six slide parts 26' each of which is arranged in one of the surfaces of the cube in such a manner that the separating line between the slide part and base part passes through the center of the engagement element 36. As has been symbolized by arrows in FIG. 11, the slide parts 26 may be drawn off from the base part 24' in a direction orthogonal to the respective separating line, and—after the halfbars have been inserted in the base part 24' and the slide part 26'—they may be thrust in in opposite direction in order to fit the half-bars together to form a full bar.

Analogously, composite nodes composed of several parts may be formed in practically arbitrary geometrical shapes for different framework configurations.

FIGS. 12 to 15 illustrate a process of mounting a framework having an integral node 14' and a bar 20 formed of at least two parts. The engagement element 36 of the node is again formed by an annular groove which, in this case, is however connected to a side surface of the node by an insertion groove 60. The bar 20 is again formed by two complementary half-bars 30, 32, but the engagement elements 34 are not half-cylindrical in this case, but are formed by projecting pegs in an eccentric position. The profile of the half-bars 30, 32 has only been shown in phantom lines, and the pegs serving as engagement elements 34 have been shown in cross-section.

Figure 12:
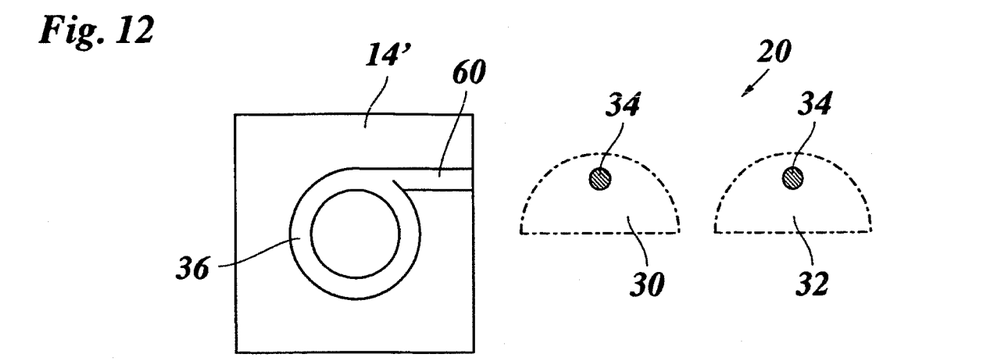
FIGS. 12 to 15 show different stages in a mounting process of a framework according to another embodiment of the invention.
Figure 13:
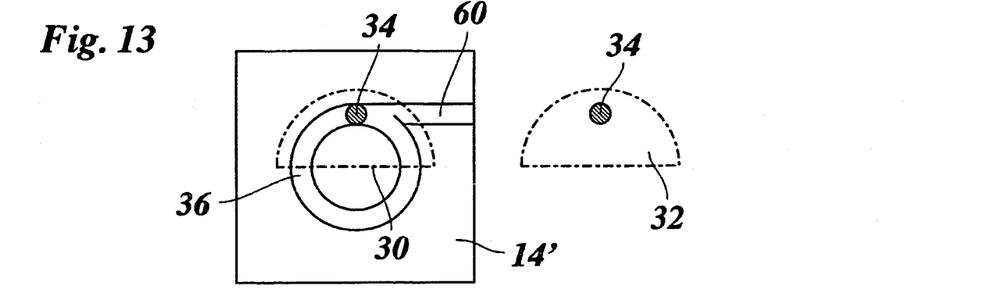

In FIG. 12, none of the half-bars is connected to the node 14'. Then, the half-bar 30 is inserted between the node 14 and a corresponding node at the opposite end of the halfbar. In this process, the engagement element 34 is moved through the insertion groove 60 until the configuration of FIG. 13 is reached.

Figure 14:
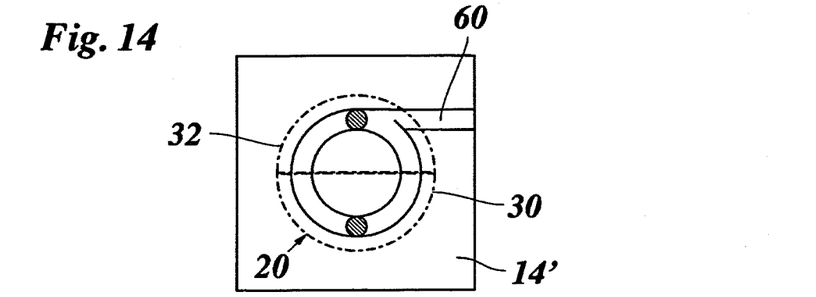

The half-bar 30 is then rotated 180° about the central axis of the annular engagement element 36 (i.e. about the central axis of the full bar to be formed), whereby the engagement element 34 is moved through the annular groove, and the second half-bar 32 is mounted correspondingly via the insertion groove 60 so as to complete the bar 20, as shown in FIG. 14. Then, the bar 20 is rotated in its entirety, about an angle of 90° into the position shown in FIG. 15, so that the engagement elements 34 reach the positions shown in FIG. 15 and establish form-fit with the engagement elements 36 for holding the half-bars together.

Figure 15:
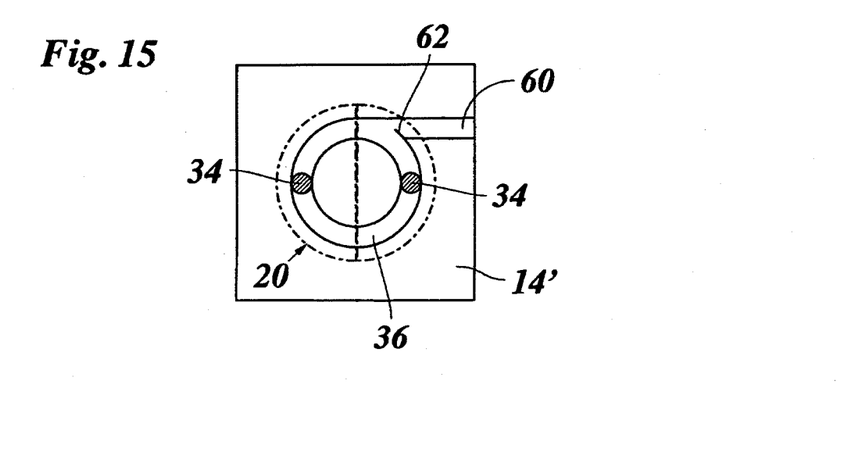

Optionally, the half-bars may be glued together with an adhesive, thereby preventing that the half-bars may later be removed via the insertion groove 60.

In this example, a one-way stop 62 (FIG. 15) in the form of an elastic prong is formed at the mouth of the insertion groove 60. When the peg-shaped engagement element 34 is inserted, the prong may give way, but it will then prevent a return of the peg into the insertion groove 60.

As an alternative, the insertion groove 60 may be closed by a plug, or the insertion groove and/or the annular groove forming the engagement element 36 or parts thereof may be filled with a casting component.

The principle that has been illustrated in FIGS. 12 to 15 may be generalized to frameworks the bars of which are formed by three or more (sector-shaped) parts in the vicinity of the engagement elements.

Figure 16:
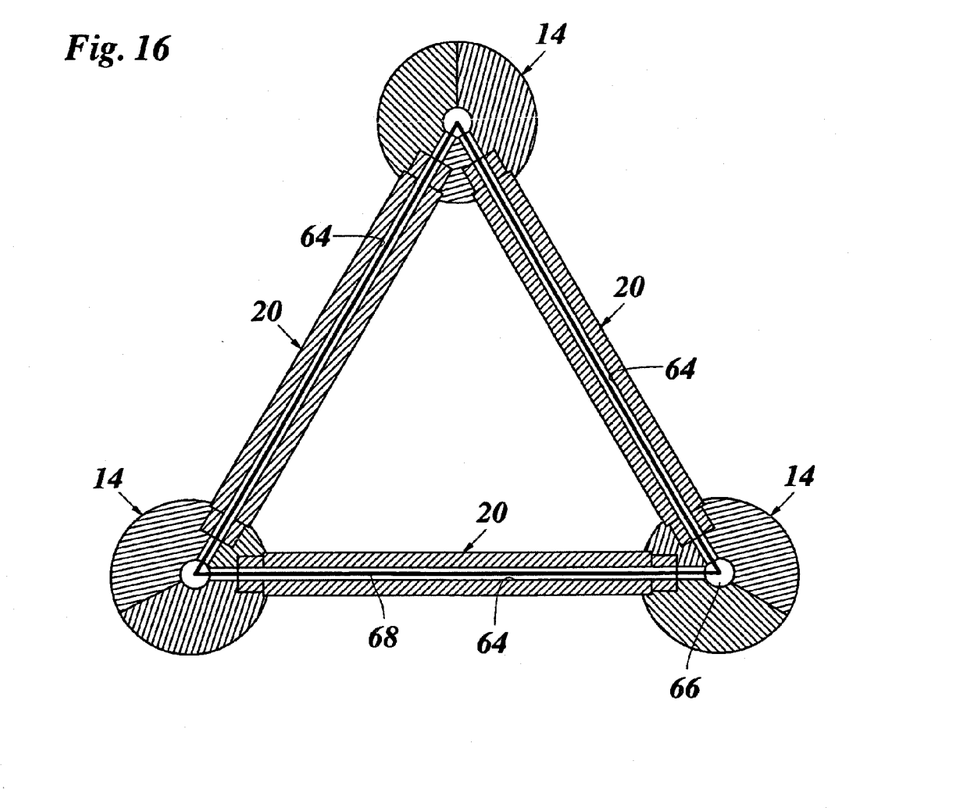
FIG. 16 is a cross-sectional view of a part of a framework according to the invention.

FIG. 16 shows a sectional view of a triangular frame that is formed by nodes 14 and bars 20 and may form part of a larger framework. The nodes 14 are in this case composed of at least three parts, so that the bars 20 may be inserted in the manner that has been described above. It is a particular feature of this embodiment that the bars 20, including their engagement elements are formed as tubes and thus form a central passage 64 that goes through in axial direction. The nodes 14 are also formed with internal cavities 66 that connect the passages 64 of the different bars to one another, so that a contiguous network of cavities is formed that may extend through the entire framework or parts thereof. This network of cavities may for example be used for electrical leads, signal leads or the like. When the parts forming the bars 20 and the nodes 14 are fluid-tightly connected to one another, e.g. by gluing or welding, the network of cavities is hermetically sealed, so that it may also be used as a piping network for liquid or gaseous media.

In the example shown in FIG. 16, the network of cavities serves for accommodating an armor that may be formed for example by tension ropes or other tension elements 68. When the ends of these tension elements 68 are form-fittingly anchored in the respective nodes 14, this will significantly increase the tensile strength of the junction formed between the bar 20 and the corresponding node. When the tension element is put under tension, the nodes and the intervening bar are firmly tightened together.

In the example shown, the tension elements 68 of the individual bars 20 are connected to one another inside of the nodes 14, thereby forming a triangular mesh in FIG. 16 and, in the general case, a network that corresponds to the network of cavities formed by the passages 64 and the cavities 66. Each mesh of the network formed by the tension elements 68 needs to be put under tension only at a single point, with the result that all nodes 14 and bars 20 belonging to this mesh are firmly tightened together.

A procedure for mounting a framework that is reinforced by an armor in this way, may comprise a first step in which parts of the nodes 14 and parts, e.g. half-bars, of the bars 20 are connected to form a part-framework. In this part-framework, the passages 64 and the cavities 66 will be open, so that the armor may be placed therein. The armor may consist of prefabricated closed meshes similar to the triangular mesh that is formed by the tension elements 68 in FIG. 16.

Depending on the configuration of the framework, the network may also image the entire structure of the network and may then be placed in the part-framework, so that the meshes of the network are accommodated in the passages 64 and the cavities 66. If the network forming the armor is tensionally elastic or shrinks upon cooling, it may also be used for creating a pre-tension. Finally, the framework is completed by mounting the complementary parts of the nodes and the complementary parts of the bars which are already connected to one another, and the framework is locked by rotating the bars 20.

Figure 17:
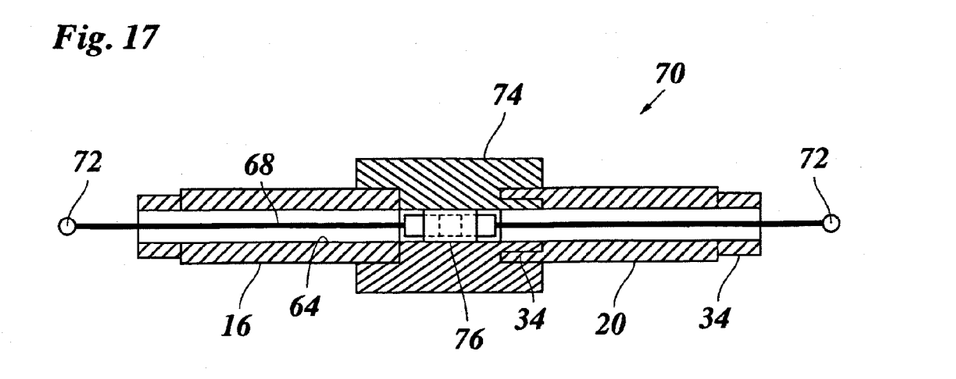
FIG. 17 is a cross-sectional view of a single bar having a tensioning mechanism.

FIG. 17 illustrates a possibility to put a tension element 68 passing through the interior of a bar 70 under tension even after the framework has been mounted. FIG. 17 shows only a single bar 70 without the associated nodes and without other parts of the framework. The tension element 68, e.g. a steel rope, a natural fiber rope or the like, has its ends formed with plugs 72 that are anchored in the nodes that have not been shown. (In an alternative embodiment, the plugs may also be anchored at bars that are connected via at least one node.)

The bar 70 is longitudinally sectioned into a hollow but integral bar 16 and a bar 20 composed of two half-bars and formed with cylindrical engagement elements 34. The bars 16 and 20 are connected by a node 74 which, similarly to the node 14 described above, is composed by two parts and forms engagement elements that are complementary to the engagement elements 34 of the bar 20.

On the other hand, the bar 16 can be connected to the node 74 and to another node (not shown) at the opposite end by conventional plug-in junctions. When the framework is mounted, the plug-in junctions are established first, similarly as in FIG. 1, and then the bar 20 is inserted in the described manner between the composite node 74 and another composite node 14 (not shown) and is locked. The parts of the node 74 and the half bars forming the bar 20 can be glued together, but the contact surfaces of the engagement elements 34 are not glued at the node 74, so that the node 74 remains rotatable about the longitudinal axis of the bar 20.

Together, the bars 16 and 20 and the node 24 form a through-going passage 64 accommodating the tension element 68. However, a tensioner 76 with a known construction is fixed inside of the node 74, so that the tension element may be tensioned. For example, the tensioner may be a sleeve that is fixedly held in the node 24 and has a right-handed thread at its one end and a left-handed thread at its other end, with threaded bolts fixed at the corresponding ends of the tension element 68 being screwed-in, so that tension element can be tensioned by rotating the node 74.

If the tension element 68 is of a type that shrinks in length when twisted, as is the case for example with a rope, then the tensioner may simply be formed by fixing the part of the rope that passes through the node 74 at this node, so that, when the node is rotated, the sections of the rope lying on opposite sides of the node are twisted in opposite directions. As the case may be, a rotation stop should be provided for preventing the node 74 from rotating back under the tensional force of the rope. The rotation stop may for example be formed by a transverse pin passing through the node 74 and one of the bars 16, 20, a ratchet mechanism formed between the node 74 and one of the bars, or the like.

Figure 18:
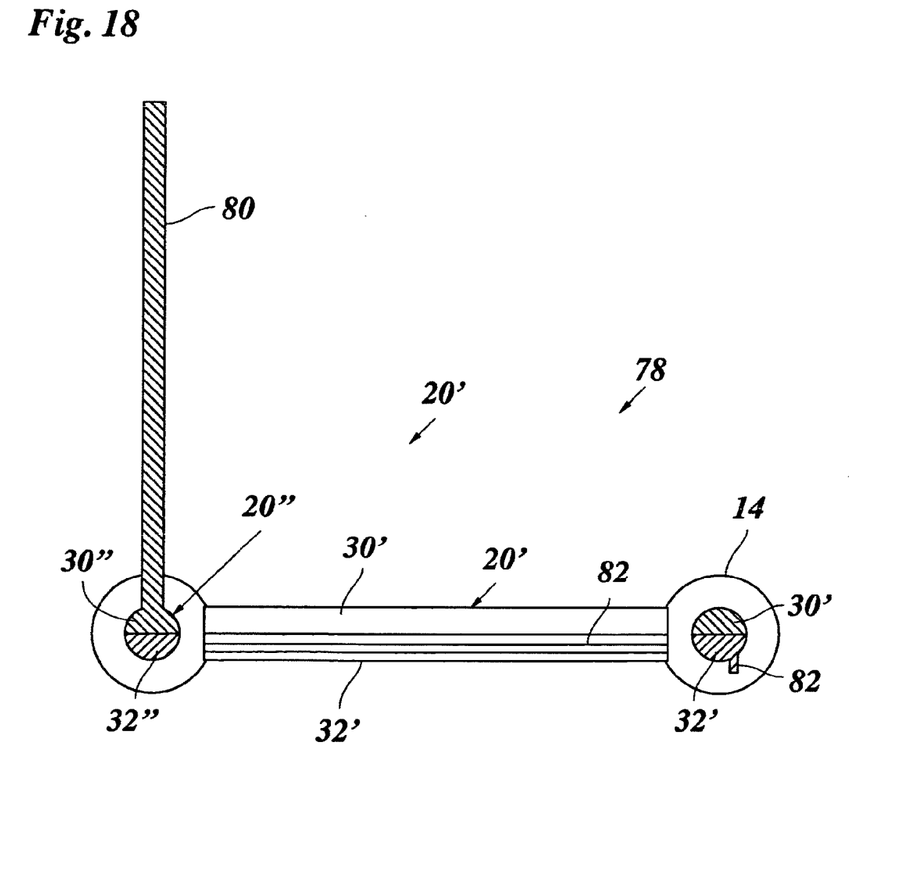
FIG. 18 is a sectional view of a frame of a bar-type supporting framework having a plate-like filling element, in a stage during the mounting process.
Figure 19:
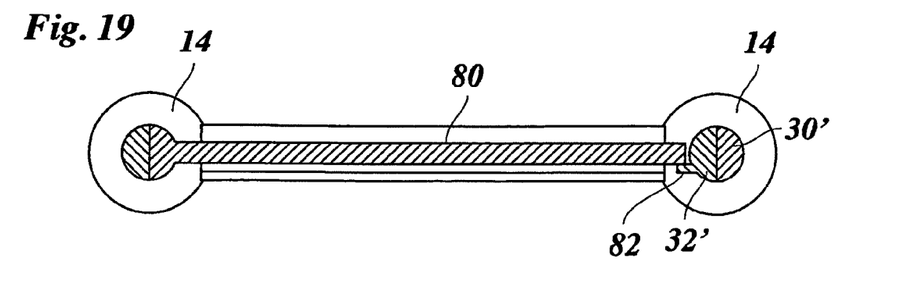
FIG. 19 is a sectional view of the frame shown in FIG. 18 after completion of the mounting process.

In a modified embodiment of the framework according to the invention, the bars may also be formed by two-dimensionally extended elements. As an example, FIGS. 18 and 19 show a sectional view of a rectangular frame 78 of a framework having four nodes 14 (only two of which are visible), three bars 20' and one bar 20", that are each composed of half-bars 30', 32' and 30", 32", respectively. The bar 20" is rotatably supported between the corresponding nodes, and its half-bar 30" forms a flap 80 that may fill the entire frame 78.

In FIG. 18, the flap 80 is shown in an open position. When the engagement elements are configured in the way that has been described in FIG. 2, for example, the position shown in FIG. 18 will also be the position in which the parts of the node are not form-fittingly locked together by these engagement elements. When the flap 80 is tilted into the closed position shown in FIG. 19, the locking engagement between the parts of the node 14 is established.

Each of the three other bars 20' forms a stop 82 for the flap 80. This stop is respectively formed at the half-bar 32' and is rotated into the active position, when the half-bars 30' and 32' are rotated into the locking position. When, finally, the free end of the flap 80 (the right end in FIG. 19) is mechanically locked at the stop 82 in some way, the bar 20" and the bar 20' opposite thereto are also fixed in their locked condition.

The invention claimed is:

1. A bar-type supporting framework comprising:
a plurality of nodes having engagement elements, and
a plurality of bars having engagement elements which hold the bars between the nodes in a form-fitting manner at least in a direction transverse to a longitudinal direction of each bar,
wherein at least one of the following of
at least one bar and
at least two nodes connected by a bar are formed of a plurality of parts constructed so that at least one of the following conditions exist:
the parts of at least one said bar formed of a plurality of parts, are form-fittingly held together by the engagement elements of the nodes when the engagement elements of the bar are rotated relative to the engagement elements of the nodes about an axis extending in the longitudinal direction of the bar, and
the parts of said at least two nodes formed of a plurality of parts, are form-fittingly held together by the engagement elements of the at least one bar when the engagement elements of the at least one bar are rotated relative to the engagement elements of the nodes about said axis extending in the longitudinal direction of the at least one bar.

2. The framework according to claim 1, wherein the engagement elements at at least one of the bars and nodes are formed of a plurality of parts that supplement each other to form a rotationally symmetric structure.

3. The framework according to claim 1, wherein at least one bar is formed of two half-bars fitted together at a longitudinally extending separating plane.

4. The framework according to claim 1, wherein the engagement elements are configured for a form-fitting locking of each bar and corresponding node to one another also in the longitudinal direction of the bar.

5. The framework according to claim 4, wherein the engagement elements have thread-like structures adapted to tighten the node axially against an end of the bar when the bar is rotated.

6. The framework according to claim 1, wherein the bars have internal passages, and the nodes have internal cavities interconnecting the passages to form a network of cavities.

7. The framework according to claim 6, wherein the network of cavities accommodates an armor.

8. The framework according to claim 7, wherein the armor includes a tension element that passes through at least one of at least one bar and at least one node and connects a plurality of the bars and nodes of the framework with tensile strength.

9. The framework according to claim 8, wherein two of said bars are connected to form a longer bar by a node that is rotatable relative to these bars, the tension element passes through this node, and the node includes a tensioning mechanism for tensioning the tension element.

10. The framework according to claim 6, wherein the passages and cavities are fluid-tightly sealed from the environment and form part of a piping network.

\* \* \* \* \*